United States Patent
Li et al.

(10) Patent No.: US 10,750,683 B2
(45) Date of Patent: Aug. 25, 2020

(54) DRIP IRRIGATION EMITTER FLOW CHANNEL STRUCTURAL DESIGN METHOD AND FRACTAL FLOW CHANNEL DRIP IRRIGATION EMITTER PRODUCT THEREFOR

(71) Applicant: China Agricultural University, Beijing (CN)

(72) Inventors: Yunkai Li, Beijing (CN); Bo Zhou, Beijing (CN); Ji Feng, Beijing (CN); Peiling Yang, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 0 days.

(21) Appl. No.: 15/773,948

(22) PCT Filed: Jun. 24, 2016

(86) PCT No.: PCT/CN2016/000339
§ 371 (c)(1),
(2) Date: May 4, 2018

(87) PCT Pub. No.: WO2017/147728
PCT Pub. Date: Sep. 8, 2017

(65) Prior Publication Data
US 2019/0110413 A1    Apr. 18, 2019

(51) Int. Cl.
*A01G 25/02* (2006.01)
*G06F 30/20* (2020.01)
(Continued)

(52) U.S. Cl.
CPC .............. *A01G 25/02* (2013.01); *G06F 30/00* (2020.01); *G06F 30/13* (2020.01); *G06F 30/20* (2020.01);
(Continued)

(58) Field of Classification Search
CPC .............................. A01G 25/02; G06F 17/50
(Continued)

(56) References Cited

U.S. PATENT DOCUMENTS

2015/0106237 A1    4/2015    Lorenz et al.

FOREIGN PATENT DOCUMENTS

| CN | 101021881 A |   | 8/2007 |
|----|-------------|---|--------|
| CN | 102609569 A | * | 7/2012 |
| CN | 202958354 U |   | 6/2013 |

OTHER PUBLICATIONS

International Search Report dated Sep. 8, 2017, in International Application No. PCT/CN16/00339.

* cited by examiner

*Primary Examiner* — Jigneshkumar C Patel
(74) *Attorney, Agent, or Firm* — Ramey and Schwaller LLP; William P. Ramey; Melissa D. Schwaller (57) ABSTRACT

A drip irrigation emitter flow channel structural design method and a fractal flow channel drip irrigation emitter product therefor. The method comprehensively considers within a design process the hydraulic performance and anti-blocking performance of a drip irrigation emitter, and mainly comprises stages such as simulation method establishment, flow channel configuration selection, structural parameter determination and flow channel boundary optimization. An optimal flow channel configuration and a structural parameter value range of a drip irrigation emitter flow channel are determined via an optimal value simulation model, thereby defining a drip irrigation emitter primary prototype structural design method.

8 Claims, 8 Drawing Sheets

(51) Int. Cl.
*G06F 30/13* (2020.01)
*G06F 30/00* (2020.01)
*G06F 113/14* (2020.01)

(52) U.S. Cl.
CPC ......... *G06F 2113/14* (2020.01); *Y02A 40/237* (2018.01)

(58) Field of Classification Search
USPC ........................................................ 700/284
See application file for complete search history.

DRIP IRRIGATION EMITTER FLOW CHANNEL STRUCTURAL DESIGN METHOD AND FRACTAL FLOW CHANNEL DRIP IRRIGATION EMITTER PRODUCT THEREFOR

RELATED APPLICATIONS

This application is the United States National Phase of International Application PCT/CN2016/000339, filed Jun. 24, 2016 which is specifically incorporated by reference in its entirety herein.

FIELD

This invention relates to the field of high-efficiency water reserve technique. The invention is especially focused on fractal channel product meeting the flow capacity demand of the users.

BACKGROUND

The good settlement of clogging issues (the drips) is the key to reserve the evenly water discharge, enlarge longevity and enhance efficiency of the emitter. Currently, there is a complex situation of water shortage and water pollution. The reclaimed water, slightly polluted water, high sand water or brackish water is often used in agricultural irrigation, making the clogging even more risky and complicated.

The resolution to the problems lies in the update of the emitter structure, where the particle transport capability and self-clean capability of the wall surface can be greatly optimal. The energy dissipation designing is the key.

Labyrinth channel is the most recognized design for energy dissipation. However, this kind of design is complicated. As it is short of knowledge background and due to its heavy reliance on the simulation of foreign advanced drip, it takes several modifications before finally being produced. It is especially true in the modelling process. If the spare parts fail to meet the requirement during testing period, the modification has to start back to the mold alteration. Sometimes the mold even has the risk of being turned down. The whole product-making period, therefore, will last 4-5 months with the cost over 50 thousand Yuan. It is time and energy consuming, expensive, and most importantly, lack of quality assurance.

There are some specialists who have developed new ways to optimize the drip irrigation emitter. For instance, Professor Yang Peiling from China Agricultural University greatly improved the anti-clogging capacity of the drip emitter by downsizing the section of structural characteristics of the path. (China patent, CN 200710063794.6); Wang Jiandong with his co-researchers from China Institute of Water Resources and Hydropower Research put forward a low-pressure sawtooth channel drip irrigation emitter through experimental and simulate study. (China Patent, CN201220669437.0). Above mentioned methods, however, mainly focus on the optimal design of channel borderline. No clarification is given to the control value of the design nor is focused on the development of an optimal flow capacity-oriented design.

SUMMARY

This optimal water discharge capacity-oriented channel invention is promoted to cope with the drawbacks of the current technology, the product theory or product development. The planar and cylindrical emitter with best hydraulic performance and anti-clogging capability is hereby promoted, which fundamentally improves the design, development and production of drip irrigation emitter worldwide.

The technical solutions are as follows:

A method for designing a flow capacity-oriented drip irrigation emitter channel contains the following steps:

Step 1: determining an optimal flow channel structure by choosing from several flow channel structures put forward by a user according to design requirements of the user.

Step 2: determining the optimal structural parameters of the optimal channel by calculating the anti-clogging parameter P and flow coefficient K.

The parameters for the channel includes: width (W), length (L) and depth (D).

The anti-clogging parameter P is applied to evaluate the anti-clogging performance of the emitter. The higher the P value, the better the anti-clogging performance.

The flow coefficient K is applied to evaluate the sensitivity of the discharging capacity upon various entrance pressure. The lower the k value, the less sensitive to the entrance pressure, the better the hydraulic performance.

Step 3: Finding out best channel structure through these optimal parameters.

The unit of the parameters are calculated in mm.

In the above method, structural parameters of several channels shall be taken to calculate the anti-clogging evaluation parameter P and flow coefficient K.

In above mentioned method, step 1 contains the following procedure:

1) Using a simulation model under the condition of initial roughness to examine different channel structures put forward by the user (such as fractal path, tooth path, triangle path, rectangular path or trapezoidal path), simulate the solid-liquid-gas movement of the water and particles in the channel. The average value of the near wall flow shear force t (Pa) is thus obtained;

The average sidewall roughness values under the condition of initial roughness are all default values.

2) Putting the simulation result oft into the formula (1) $\overline{S_q} = -11.43\overline{t}^2 + 7.51\overline{t} + 0.81$ to obtain the average roughness values of clogging materials $\overline{S_q}$ of different channel structures;

The formula (1) shows the relationship between flow shear force value t (Pa) in the areas close to inner wall surface and the roughness value $\overline{S_q}$ (μm) of clogging material under clogging situation value of 5%. These formula is promoted by the applicants of this invention on the basis of various tests of different emitters including planar, cylindrical, single-win labyrinth and stick-strip emitter whose water resources covering the reclaimed water, high sand water, brackish or the mix of high sand and brackish water.

Therefore, formula (1) can be applied in various emitters or emitter channels (such as planar, cylindrical, single-win labyrinth type).

3) Taking the $\overline{S_q}$ value as the average sidewall roughness value of the channel and put it into simulate model under initial roughness condition to obtain the different simulate channel models of different channel structures under real roughness conditions.

4) Using the simulate channel model under real roughness condition of various channel structures obtained from step 3) to examine respectively the various channel structures put forward by the user and simulate the solid-liquid-gas movement of the water and particles in the channel. In this way, the turbulent strength of respective inner channel is collected.

The best channel structure shall be the one with best turbulent strength.

In this method, Step 2 contains the following procedures:

5) Applying a simulation model which is corresponds to the best channel structure under real roughness condition, under the condition of satisfying the energy dissipation requirement (no jet-flow) and flow index x value of 0.50-0.55, the energy dissipation requirement and flow index x being less influenced by the change of parameters of the best selected channel, the optimal parameter value scopes (the controlled value) of best channel, is determined with specific channel parameters including value scope of W (width), L (length) and D (depth).

6) According to the values of the scopes obtained from step 5, Selecting respectively equal numbers of various W, L, D as representative value (the more of the representative value, the more accurate of the parameter of the best channel). Each representative value shall be selected in equal space value.

Using the simulation model which is corresponds to the best channel structure under real roughness condition to simulate respectively the flow capacity Q represented by combination groups of values in ascending order under different entrance pressures (H). the formula (2) is thus acquired: $Q=kH^x$. In formula (2), Q stands for flow capacity, k for flow coefficient, H for entrance pressure and x for flow index;

When the flow coefficient k is obtained, the respective group that representing channel parameter will be simulated together with flow coefficient k to obtain the forecast model of flow coefficient k.

7) Arranging the combination groups in step 6) or combination groups obtained through the method stated in step 6) with the ascending order of the channel parameters to calculate the anti-clogging index P of each combination group. Toleration of P value from two adjacent groups (that is $$\frac{P_{i+1} - P_i}{P_i}$$

will then be calculated. Selecting a certain number of groups from (that is the i group when is satisfied with $$\frac{P_{i+1} - P_i}{P_i} < s\ \%,$$

i represents for different parameter groups) those two adjacent deviation values P are under s % (s shall be positive number under 100, suppose s=1). Put these selected channel parameters respectively into the prediction model of flow coefficient k to obtain the k value. The best channel parameters shall be the one with smallest k value.

In the scope value (the controlled value scope) of the structural parameters for best channel design, the parameters of hydraulic performance, that is the flow index x is only influenced by the structure of the channel and is less sensitive to the parameter changes of the channel. The anti-clogging property is greatly influenced by these changes. This invention, therefore, is trying to obtain optimal channel parameter and channel prototype by evaluating the anti-clogging value P. Specifically, the P value is calculated by different group calculation in respect of length, width and depth of the channel.

In above mentioned method, the forecast model of flow coefficient K stated in step 6) is calculated in formula 3):

$$k = a \times \frac{(W \times D)^b}{L^c}.$$

In this formula, a, b, c refers to the undetermined coefficients; L, W, D refers to length, width, depth of channel parameters.

The calculation of anti-clogging index P sated in step 7) in above mentioned method is as follows:

$$P = \frac{L^2 \times W^{0.5} \times D^{0.5}}{Q_{rated}} \times \left(d \times \frac{W}{D} + f\right); \quad (4)$$

In formula 4, d and f refer to the undetermined coefficients, L, W, D refers to length, width, depth of channel parameters (unit: mm); $Q_{rated}$ refers to the designed flow capacity as required by users (unit: L/h).

According to step 7 of the method, anti-clogging evaluation index P for planar emitter is calculated by formula (5):

(The P in formula (4) is set with d=−15.723, and f=21.093)

$$P_{planary} = \frac{L^2 \times W^{0.5} \times D^{0.5}}{Q_{rated}} \times \left(-15.723 \times \frac{W}{D} + 21.093\right).$$

The anti-clogging evaluation index P for cylindrical emitter is calculated by formula (6):

(The P in formula (4) is set with d=−0.167, f=1.243)

$$P_{cylindrical} = \frac{L^2 \times W^{0.5} \times D^{0.5}}{Q_{rated}} \times \left(-0.167 \times \frac{W}{D} + 1.243\right),$$

The anti-clogging evaluation index P for single-wing labyrinth channel emitter is calculated by formula (7):

(The P in formula (4) is set with d=−1.345, and f=3.489)

$$P_{single-winglabyrinthchannel} = \frac{L^2 \times W^{0.5} \times D^{0.5}}{Q_{rated}} \times \left(-1.345 \times \frac{W}{D} + 3.489\right).$$

The step 4 of the method for designing channel also contains:

Upgrade the channel model stated in procedure 3 to a second level. That is, optimize the value of flow shear force close to inner wall surface, making it out of the original value of 0.2-0.4 Pa.

The mentioned inner wall is divided into different sections such as front upwind dental tip area, upwind dental root area, downwind dental tip area and downwind dental root area.

According to step 4, the optimal channel also adopts the vortex washing wall design as follows:

Analyze the vortex distribution of the optimal flow channel structure in step 3. According to outer edge shape and size of the vortex, the location of the flow shear force close to inner wall surface at shear force value of 0.2-0.4 Pa is designed into some arcs that are the same size and shape of the outer border of the vortex.

This optimal vortex design enables the full development of vortex, improve self-clean capability of the flow channel surface and promote the anti-clogging capability.

According to the channel design method above, the value of the flow shear force close to inner wall surface is obtained from the calculation of the water flow and particle movement in the form of solid-liquid-gas using simulate channel model under simulated condition of real roughness or simulate channel model under real rough condition.

The simulation of the above design method applies the FLUENT software.

In the above flow channel design the initial simulate model under initial roughness condition applies both the RNG (Renormgroup) k-ε and VOF (Volume of Fluid) model to represent the turbulent model movement of water flow and particles in inner channel under solid-liquid-gas form.

And experienced values are used as the default average sidewall roughness values in simulate model under initial roughness condition. Especially, the experienced value can be rated at 869 nm.

In above mentioned design, the solid volume fraction, liquid volume fraction and gas volume fraction under initial roughness condition differs as the quality of water resource changes. The sum of the three values can be 1.

In one embodiment, the solid volume fraction, liquid volume fraction and gas volume fraction is respectively set as 0.9%, 1.1% and 98%.

Use the above method to design an optimal channel structure and then rated the shape in 3D version by UGNX software. Finally, a highly precise structure is obtained according to user's requirement (accuracy shall no less than ±5 μm). Together with the selected drip material, wall thickness setting, the emitter is able to industrialization and manufactured.

This invention is to offer protection to the applied drip irrigation emitter products.

The channel structure of the emitter is a fractal flow path. In an embodiment, the fractal flow path is a modified M-fractal flow path.

The two openings of the fractal flow path are respectively connected to the water entrance on one side and water exit of the emitter on the other side.

Figure 2A:
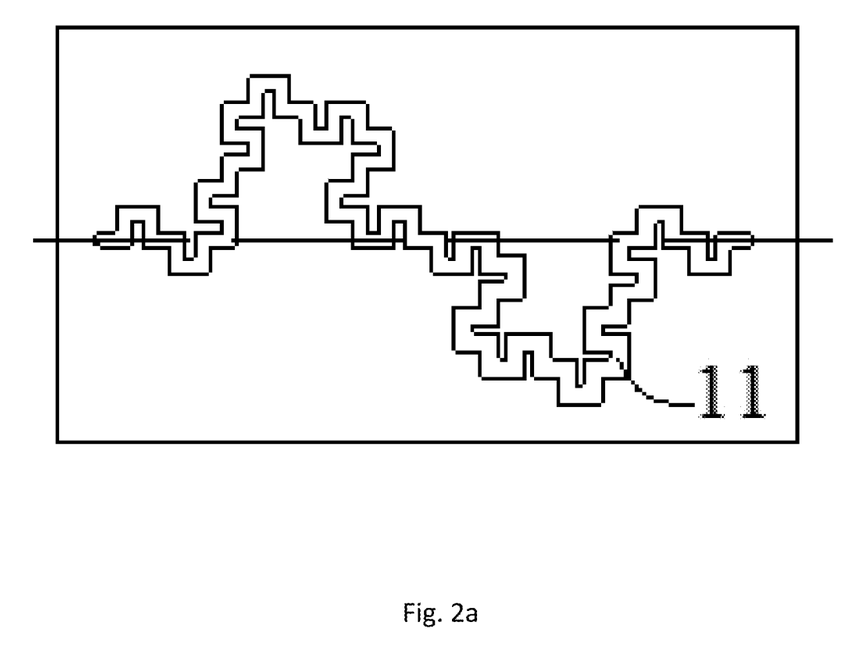
FIG. 2(a) shows a model of a Fractal M channel.
Figure 2B:
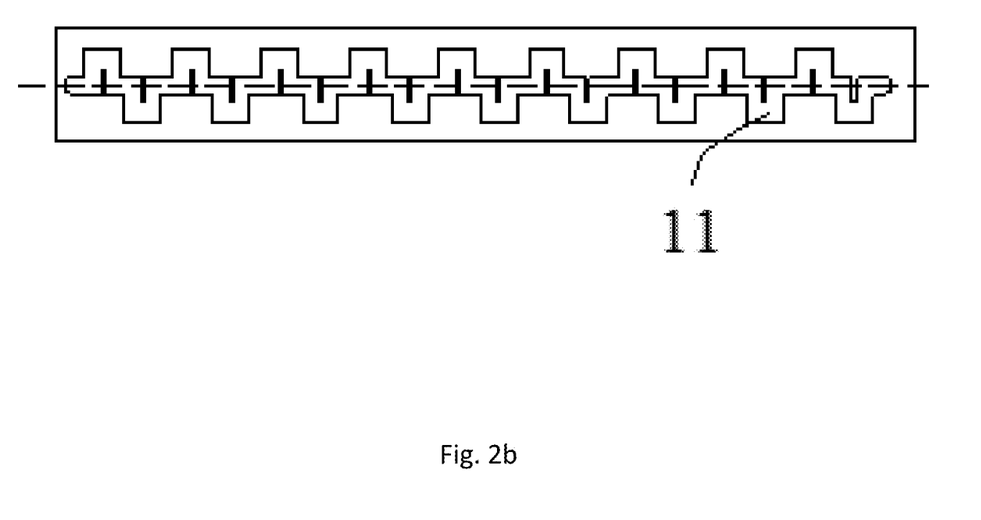
FIG. 2(b) shows a modified fractal-M channel.

For a planar-type emitter, the fractal channel shall be designed as follows: length: 39.567 mm, width: 0.824 mm, depth: 0.7555 mm, the upwind dental tip and dental root area in inner channel shall be designed into arcs with radius of 0.412 mm;

For a cylindrical emitter, the fractal channel shall be designed as follows: length: 214.4 mm, width: 1.27 mm, depth: 0.745 mm, the upwind dental tip and dental root area in inner channel shall be designed into arcs with radius of 0.423 mm;

FIG. 2(a) shows a model of a Fractal M channel, by taking Minkowski curve as the fractal channel design base or as the model of Fractal M channel, specifically, in consideration of the design requirement and in principal of keeping the number and order of the energy dissipation unit in line with the original model, the fractal channel is simplified and developed into a modified fractal-M channel shown as FIG. 2(b).

The length of the flow path in this invention refers to the length of central flow path, that is, the lines that are composed by the perpendicular distance of sidewall to the center point.

The beneficial points of this invention.

Through this invention, the following problems are effectively resolved:

(1) Bring forward a flow capacity-oriented drip irrigation emitter. using cycling and level by level channel update design approach According to this design, it offers a comprehensive consideration of hydraulic performance (flow index x) and anti-clogging performance (vortex strength, anti-clogging evaluation index P) and illustrates procedures of various aspects including the stage of method simulation building ((step 1)-step 3)), channel selection (step 4)), determination of structural parameters (step 5)-7)), channel borderline update (step 4) etc.

(2) Propose a preliminary cycling and level by level design method based on numerical modeling and numerous experimental results (step 5)-7)). It also determined the value range of the optimal channel structure and parameters (including length, width and depth) by means of the optimal numerical model (that is modeling under real roughness condition), meanwhile, it recognizes an initial structural designing method of drip irrigation emitter.

(3) It also puts forward a vortex-cleaning method for channel borderline cleaning and confirms the update control value of the borderline (the flow shear strength of inner wall where close to wall surface goes beyond 0.2-0.4 Pa). The refined structural design (the second level design) is also affirmed.

(4) Planar and cylindrical fractal emitter are brought out using fractal geometry theory (Product A and Product B). The new products are with hydraulic performance (flow index between 0.50 and 0.52) and high anti-clogging capability (consecutive operation period reaching 680-840 h).

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 2 shows a fractal-M channel prototype and the modified fractal-M channel.

FIG. 3(a) shows vortex strength in fractal channel, FIG. 3(b) shows vortex strength in tooth channel, FIG. 3(c) shows vortex strength in trapezoidal channel, FIG. 3(d) shows vortex strength in triangle channel, FIG. 3(e) shows vortex strength in rectangular channel;

FIG. 9(*a*) shows the scheme of the designed channel; FIG. 9(*b*) shows the sectional view of the designed channel alone line 1-1 in FIG. 9(*a*); wherein W represents width, L represents length, D represents depth.

LIST OF REFERENCE NUMERALS

Exit 12
Entrance 10
Channel 11
Upwind tooth tip area 13
Downwind tooth tip area 15
Upwind tooth root area 16
Downwind tooth root area 14

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

Detailed descriptions are given below in combination of the attached drawings.

Figure 8:
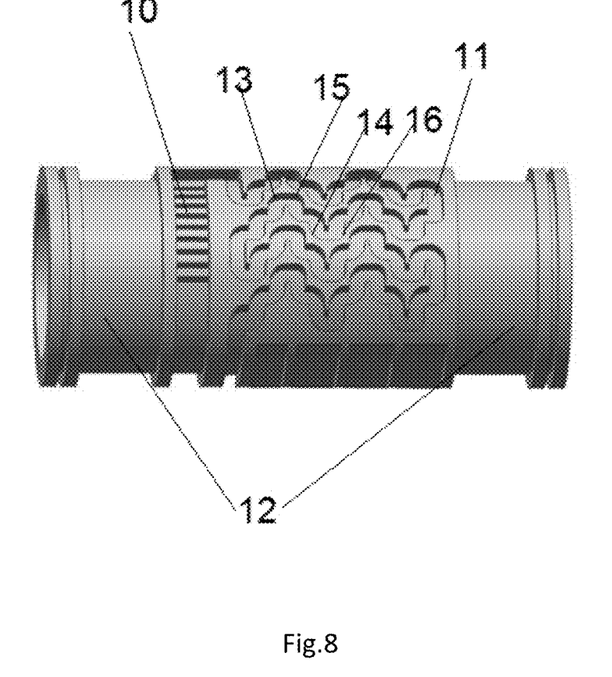
FIG. 8 shows upgraded 3D graph of optimal fractal-cylindrical CE91#.
Figure 9:
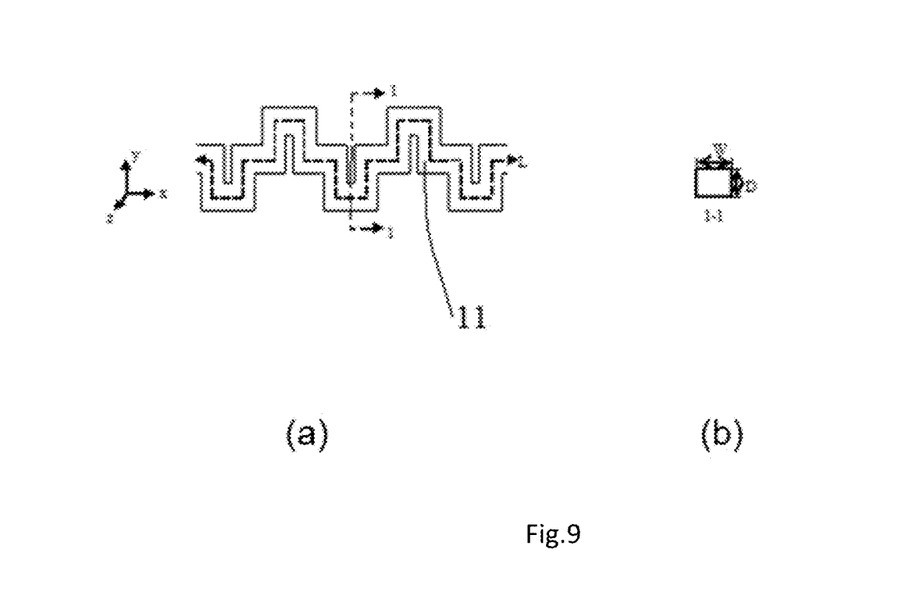
FIG. 9 shows structural parameter scheme of the designed channel.

Referring to FIGS. 8 and 9, an emitter includes an exit 12, an entrance 10 and a channel 11, the inner of the channel 11 comprises upwind tooth tip area 13, downwind tooth tip area 15, upwind tooth root area 16 and downwind tooth root area 14.

In the following formula, W, L, D respectively represent the width, length and depth of the channel (unit: mm, see FIG. 9): $Q_{rated}$ refers to the rated flow capacity of the emitter (design demand of flow capacity, unit: L/h)

The emitter mentioned here refers to the drip type emitter.

In one embodiment, a flow capacity-oriented method is used to design drip irrigation emitter.

Figure 1:
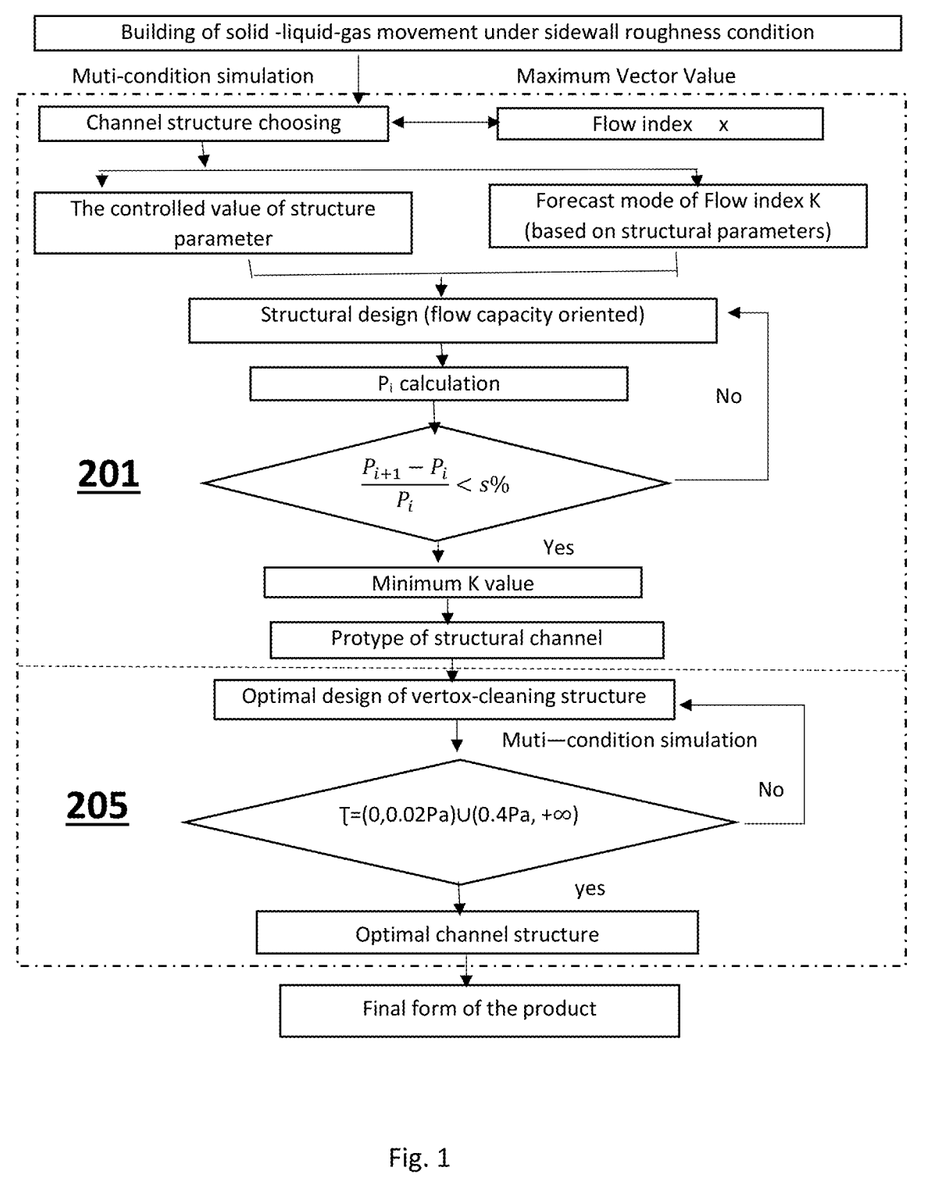
FIG. 1 shows a designing procedure of a flow capacity-oriented emitter (multi-condition simulation refers to the solid-liquid-gas flow simulation)

$Q_{rated}$ required by user is 1.6 L/h, the emitter is fractal-planar or fractal-cylindrical type. Referring to FIG. 1, the designing process include two main sections, preliminary structural design section 201 and refined structural design section 205. The purpose of preliminary structural design section 201 is to acquire the prototype of the optimal channel, the detailed designing process of section 201 is as follows:

Building model of inner solid-liquid-gas flow simulation under sidewall roughness condition.

1) Using the rough simulation model to examine different channel structures put forward by various users, stimulate the solid-liquid-gas movement of the water and particles in the channel. The flow shear force close to inner wall surface $\bar{\tau}$ (pa) is thus collected.

2) Put the simulation result of $\bar{\tau}$ into formula (1) $\bar{S_q}=-11.43\bar{\tau}^2+7.51\bar{\tau}+0.81$ to obtain the average roughness value of clogging material $\bar{S_q}$ (μm) of different flow channel structures.

3) Taking each $\bar{S_q}$ (μm) acquired in step 2) as average sidewall roughness value and put them into simulation model under condition of initial roughness, the simulation model under real roughness condition of various channels are obtained.

In above mentioned design method, the initial simulate model under initial roughness condition applies both the RNG (Renormgroup) k-ε and VOF (Volume of Fluid Function) model to represent the turbulent model movement of water flow and particles in inner channel under solid-liquid-gas form.

The detailed design of the simulation under roughness conditions is as follows:

The initial settings of the flow field calculation are: the entrance shall be the pressure entrance with pressure value of 0.1 MPa, solid volume fraction of 0.9%, gas volume fraction of 1.1%, liquid volume fraction of 98%, a pressure exit with pressure value of 0 MPa. Except for the computational domain of entrance and exit, all other liquid or solid contact surface shall be set as non-sliding borderline; The calculation shall be solved by means of standard wall functions; average sidewall roughness value shall be 869 nm; the calculation shall apply the formula of finite volume method; the pressure item adopts the second-order upwind scheme; SIMPLE method as the pressure and velocity coupling solution; residual value as the study base of the convergence performance, that is, when the entrance flow capacity at the exit is stable with residual value below $10^{-4}$ the iterative computations is considered to reach the convergence level.

The above settings are conducted by using FLUENT software of 6.3 edition from Ansys company.

The mentioned channels are channels put forward by users, namely the fractal path, tooth path, triangle path, rectangular path or trapezoidal path); the sizes of the physical modelling (the simulated object) simulated are as follows:

Fractal path: length: 1 mm, width: 35 mm, depth: 0.73 mm;

Tooth path: width: 1 mm, length: 35 mm, depth: 0.73 mm, height: 0.84 mm, angle: 54°, tooth pitch: 1.42 mm;

Trapezoidal path: width: 1 mm, length: 35 mm, depth: 0.73 mm, height: 0.84 mm, angle: 54°, tooth pitch: 1.8 mm;

Triangle path: width: 1 mm, length: 35 mm, depth: 0.73 mm, height: 1.2 mm, angle: 54°, tooth pitch: 1.42 mm;

Rectangular path: width: 1 mm, length: 35 mm, depth: 0.73 mm;

FIG. 2(*a*) shows a model of a Fractal M channel by taking Minkowski curve as the fractal channel design base or as the model of Fractal M channel, specifically, in consideration of the design requirement and in principal of keeping the number and order of the energy dissipation unit in line with the original model, the fractal channel is simplified and developed into a modified fractal-M channel shown as FIG. 2(b). As shown in FIGS. 2(a) and 2(b), each of the two model has a channel 11.

By analyzing the flow property of the inner channel, the average flow shear strength value $\bar{\tau}$ is confirmed at 0.5 Pa. Taking t in to formula (1), the average anti-clogging roughness value $\overline{S_q}$ is determined at 1.4 μm. Put the result into calculation the simulate model under initial roughness condition to obtain real roughness simulate model of different channel; continue the following simulation work.

Initial Structural Design

Figure 3:
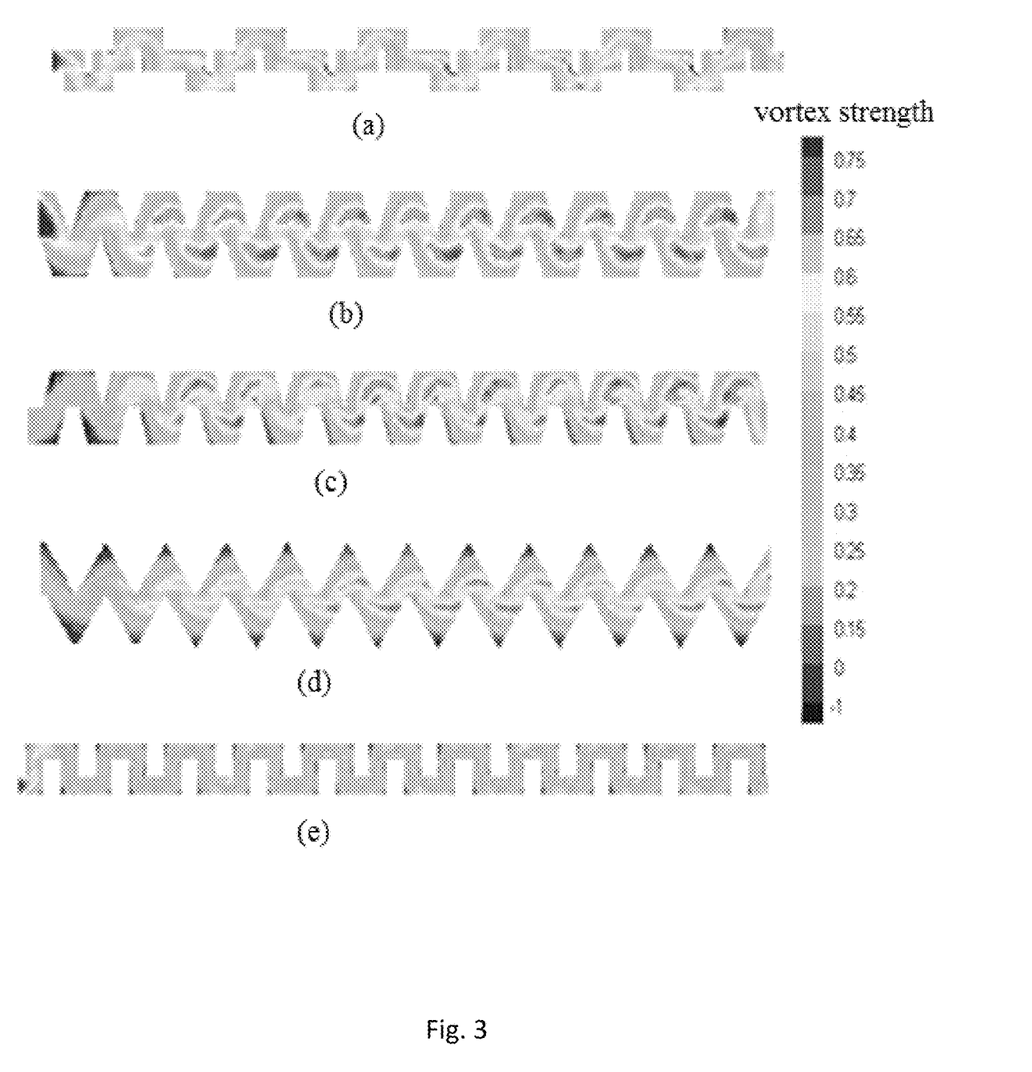
FIG. 3 shows vortex strength (anti-clogging performance) demonstrated in different channels.

4) The simulation model under real roughness condition of various channels obtained from step 3) is applied to examine respectively the various channel structures from users and simulate the solid-liquid-gas movement of the water and particles in the channel. In this way, the turbulent strength of respective inner channel is collected (see the results shown in FIG. 3).

FIGS. 3(a) to 3(e) show the gray picture of vortex strength performed in different drip irrigation channels by FLUENT software. The different vortex strength is shown in different gray levels.

As shown in FIGS. 3(a) to 3(e), the best performance of vortex strength lies in fractal channel (vortex strength is an index manifesting the anti-clogging performance. The stronger the vortex, the better performance of the anti-clogging property), the fractal channel, therefore, is confirmed to be the optimal channel (that is, the completion of channel choice stated in FIG. 1).

5) The simulation model of fractal channel under real roughness condition obtained by step 3, the confirmation of the structural parameter control value of planar and cylindrical channel (that is the width (w), length (L) and depth (D) of the channel) shall meet the following requirement: the satisfying energy dissipation requirement (no jet-flow) and flow index x of 0.50-0.55, which shall be less influenced by the change of parameters of the best selected channel. Specifically, the channel parameter confirmation contains the W value scope (width), the parameter L value scope (length), parameter D value scope (depth). The results are shown in table 1.

6) Select 20 representative values from these W, L, D scope value obtained from step 5. Each representative value shall be selected by equal space value.

Use the responding simulate model of fractal channel under real roughness condition to examine exit flow capacity Q represented by the representative values respectively in ascending order under different entrance pressure value H (specifically 0.01, 0.03, 0.05, 0.07, 0.09, 0.1, 0.11, 0.13, 0.15 Mpa). By this calculation, the formula 2 is obtained: $Q=kH^x$. In this formula, Q stands for discharging capacity, k for flow coefficient level, H for entrance pressure and x for flow index.

The flow coefficient k is then obtained, the respective group representing channel parameters will be fitted together with flow coefficient k by excel to obtain the following prediction model of flow coefficient k.

Fractal-Planar Type:

$$k_{FE} = 15.44 \times \frac{(W \times D)^{1.28}}{L^{0.53}}; \quad (8)$$

Fractal-Cylindrical Type:

$$k_{CE} = 12.21 \times \frac{(W \times D)^{1.16}}{L^{0.52}}; \quad (9)$$

7) Arrange 100 representative values according to the method stated in step 6) and set them up in an ascending order to obtain the anti-clogging index P of each group using formula (5) and (6) (see the calculating result in table 2 and table 3). Tolerance of two adjacent P value will then be calculated. Select certain channel parameter groups of who two adjacent deviation value P are under s % (i.e. s=1). Selected certain groups ((i.e. the i group satisfying $$\frac{P_{i+1} - P_i}{P_i} < s \%,$$

i stands for different parameter groups) and put their structural parameter value respectively into formula (6), (8), (9) to obtain the prediction model of flow index k. The best channel parameters shall be the one with smallest k value.

Fractal-Planar Type:

$$P_{planary} = \frac{L^2 \times W^{0.5} \times D^{0.5}}{Qrated} \times \left(-15.723 \times \frac{W}{D} + 21.093\right) \quad (5)$$

Fractal-Cylindrical Type:

$$P_{cylindrical} = \frac{L^2 \times W^{0.5} \times D^{0.5}}{Qrated} \times \left(-0.167 \times \frac{W}{D} + 1.243\right) \quad (6)$$

When the calculation group is between $38^{th}$ (i=38) and $99^{th}$ (i=99), the $$\frac{P_{i+1} - P_i}{P_i}$$

value are all below 1%. Put the structural parameter value of $38^{th}$ and $42^{th}$ group into formula (8) to obtain the $K_{FE}$ value or K. The $38^{th}$ group of smallest K value, that is, the optimal structural parameter of the channel is this FE38# type. The size of the fractal channel is: L: 39.567 mm, W: 0.824 mm, D: 0.7555 mm;

When the calculation group is between $91^{th}$ (i=91) and $99^{th}$ (i=99), the $$\frac{P_{i+1} - P_i}{P_i}$$

value are all below 1%. Put the structural parameter value of $91^{th}$ and $96^{th}$ group into formula (9) to obtain the KcE value or K. The $91^{th}$ group of smallest K value, that is, the optimal structural parameter of the channel is this CE91# type. The size of the fractal channel in the above calculation: Length: 214.4 mm, width: 1.27 mm, depth: 0.745 mm;

FE38# and CE91# are thus determined as the prototype of the optimal channel to be further upgraded into second grade refining design.

TABLE 1

Structural Parameter Value Scope (Drip Irrigation Emitter)

| Type | Length (mm) | Width (mm) | Depth (mm) |
|---|---|---|---|
| Fractal-planar | 32.5-51.6 | 0.75-0.95 | 0.70-0.85 |
| fractal-cylindrical | 128.0-224.0 | 1.00-1.30 | 0.70-0.75 |

TABLE 2

Anti-Clogging Performance Result (Fractal-Planar Emitter)

| Number | Rated discharging value (L/h) | Length (mm) | Width (mm) | Depth (mm) | $P_{planar}$ | $\frac{P_{i+1} - P_i}{P_i}$ | k |
|---|---|---|---|---|---|---|---|
| FE1# | 1.6 | 32.5 | 0.75 | 0.7 | 2031.4 | 1.20% | |
| FE2# | 1.6 | 32.691 | 0.752 | 0.7015 | 2056.0 | 1.19% | |
| FE3# | 1.6 | 32.882 | 0.754 | 0.703 | 2080.8 | 1.18% | |
| ... | | | | | | | |
| FE37# | 1.6 | 39.376 | 0.822 | 0.754 | 3015.0 | 1.00% | |
| FE38# | 1.6 | 39.567 | 0.824 | 0.7555 | 3045.1 | 0.997% | 1.191 |
| FE39# | 1.6 | 39.758 | 0.826 | 0.757 | 3075.509 | 0.992% | 1.195 |
| FE40# | 1.6 | 39.949 | 0.828 | 0.7585 | 3106.013 | 0.987% | 1.198 |
| FE41# | 1.6 | 40.14 | 0.83 | 0.76 | 3136.673 | 0.982% | 1.202 |
| FE42# | 1.6 | 40.331 | 0.832 | 0.7615 | 3167.489 | 0.978% | 1.206 |

TABLE 3

Anti-Clogging Performance Result of Fractal-Cylindrical Emitter

| Number | Rated water discharge value (L/h) | Length (mm) | Width (mm) | Depth (mm) | $P_{cylindrical}$ | $\frac{P_{i+1} - P_i}{P_i}$ | k |
|---|---|---|---|---|---|---|---|
| CE1# | 1.6 | 128 | 1 | 0.7 | 8605.34 | 1.61% | |
| CE2# | 1.6 | 128.96 | 1.003 | 0.7005 | 8746.373 | 1.60% | |
| CE3# | 1.6 | 129.92 | 1.006 | 0.701 | 8888.694 | 1.59% | |
| ... | | | | | | | |
| CE90# | 1.6 | 213.44 | 1.267 | 0.7445 | 26514.23 | 1.00% | |
| CE91# | 1.6 | 214.4 | 1.27 | 0.745 | 26780.46 | 0.9998% | 0.702 |
| CE93# | 1.6 | 215.36 | 1.273 | 0.7455 | 27048.21 | 0.996% | 0.703 |
| CE94# | 1.6 | 216.32 | 1.276 | 0.746 | 27317.48 | 0.991% | 0.704 |
| CE95# | 1.6 | 217.28 | 1.279 | 0.7465 | 27588.27 | 0.987% | 0.705 |
| CE96# | 1.6 | 218.24 | 1.282 | 0.747 | 27860.59 | 0.983% | 0.706 |

3. Process of refined structural design section 205 (second-level) is as follows:

Optimal Design of Vortex-Cleaning Channel Structure

Figure 4:
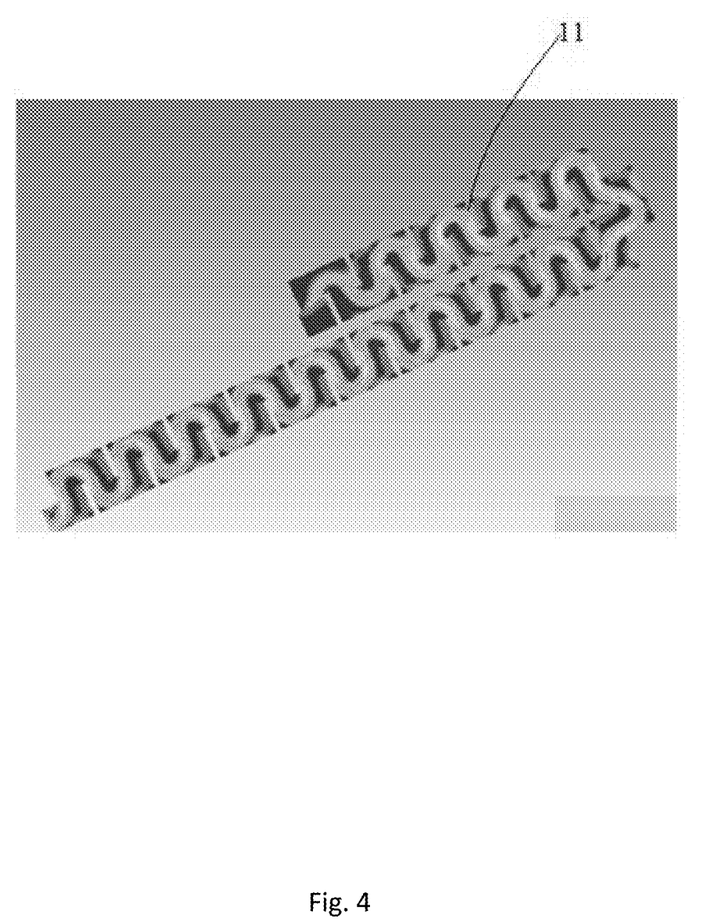
FIG. 4 shows flow shear strength distribution in inner wall of close surface of fractal planar FE38# drip irrigation emitter.
Figure 5:
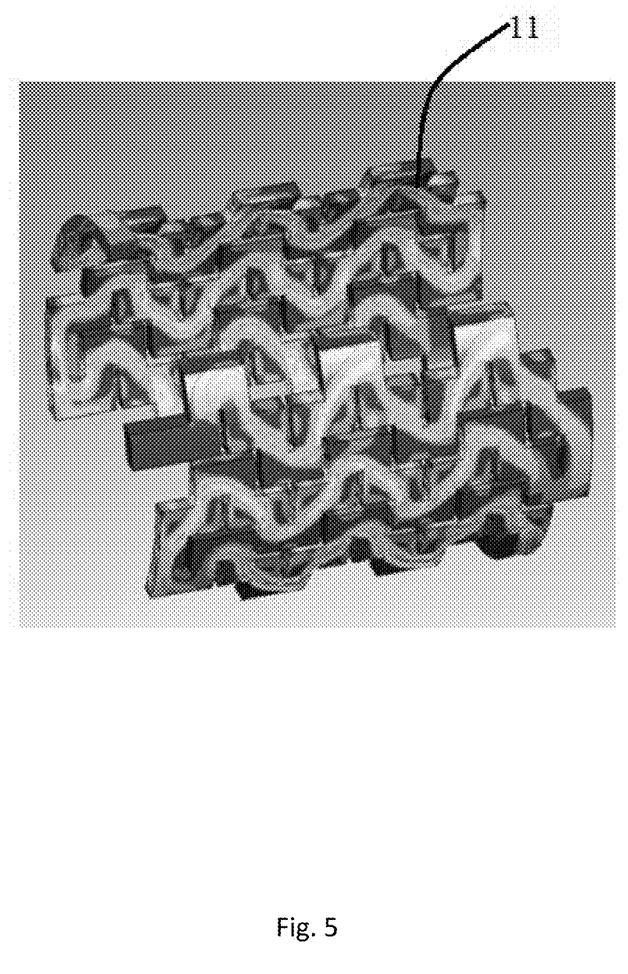
FIG. 5 shows flow shear force distribution close to inner wall surface: fractal cylindrical CE91# drip irrigation emitter.

Use the simulation model under condition of real roughness obtained from step 3) to respectively examine the solid-liquid-gas movement of the water and particles in FE38# and CE91# channel By this simulation, the flow shear strength distribution result is obtained (see the result in FIG. 4 and FIG. 5). The grey level in FIG. 4 and FIG. 5 shows the flow shear strength distribution in inner wall where close to wall surface of different channels. The calculation is done by FLUENT software and different grey levels represent different values.

FIGS. 4 and 5 indicate that the flow shear force close to wall surface of inner wall of upwind tooth tip area and upwind tooth root area in the channel 11 are at 0.2-0.4 Pa. the applicant of this patent claim, has found that the clogging material are at their highest speed of growth when the flow shear force close to wall surface of inner wall is at 0.2-0.4 Pa. To optimize this situation, an optimal vortex design is introduced with following detailed methods:

According to the size of the vortex outer edge, analyze the vortex location and set the upwind dental tip and dental root area in inner channel into arcs the same size of the vortex.

And simulate the solid-liquid-gas movement of the optimal emitter according to the fractal model under real roughness condition obtained by step 3). When the flow shear force in the areas close to wall surface of inner wall is out of 0.2-0.4 Pa, the optimal channel structure is then acquired.

When the flow shear force stays at 0.2-0.4 Pa, the optimization and simulation shall be repeated until it goes out that value.

In this example arc radius at 1, ½, ⅓ are respectively applied to optimize the FE38# emitter and CE91# emitter the solid-liquid-gas movement in these two optimal emitters are simulated using fractal model obtained by step 3) under real roughness condition.

Figure 6:
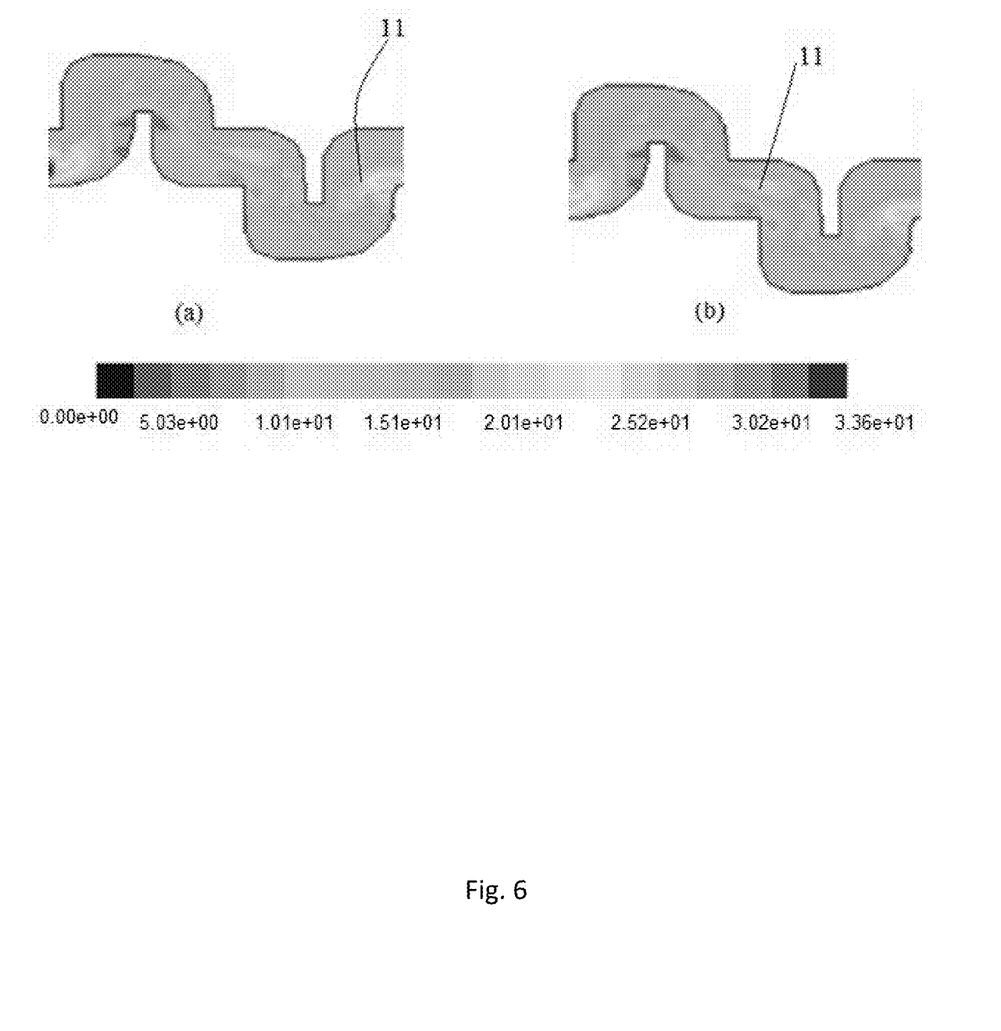
FIG. 6: shows flow shear force distribution close to inner wall surface after the second-grade refining of flow channel structure), FIG. 6(*a*) refers to planar FE38# type and FIG. 6(*b*) refers to cylindrical CE91# type. Different pressure of flow shear strength is represented by different colors.

Results:

FE38# type—In upwind tooth tip and tooth root optimization, the flow shear force in the areas close to wall surface of inner wall are all clear out of 0.2-0.4 Pa (FIG. 6(*a*)) if the arc radius is ½ of the channel width. The structure is considered to be the best channel for drip irrigation emitters.

CE91# type—the flow shear force in the areas close to wall surface of inner wall are all clear out of 0.2-0.4 Pa (FIG. 6(*b*)) if the arc radius is ⅓ of the channel width. This structure is considered to be the best channel for drip irrigation emitters.

9) Designed flow capacity validation

Take above two optimal channel structures in step 8) as the simulation model and simulate these two models with the fractal simulate model under real roughness condition from step 3). The flow capacity is directly output through FLUENT with the value of 1.58 L/h, which is 1.25% deviated from the rated flow capacity of 1.6 L/h, showing that little influence occurs by the borderline optimization (optimal vortex-cleaning design).

Final Formation

Taking above two optimal channel structures gained from step 8 as the modeling base, the product is then formulated by using UGNX to generate the 3D shape. High proficient model is developed according to per user requirement (precision value is no less than ±5 μm). With the confirmation of other parameters such as drip material and the thickness value of the wall, the products of these two optimal emitters are thus acquired and industrialized.

Figure 7:
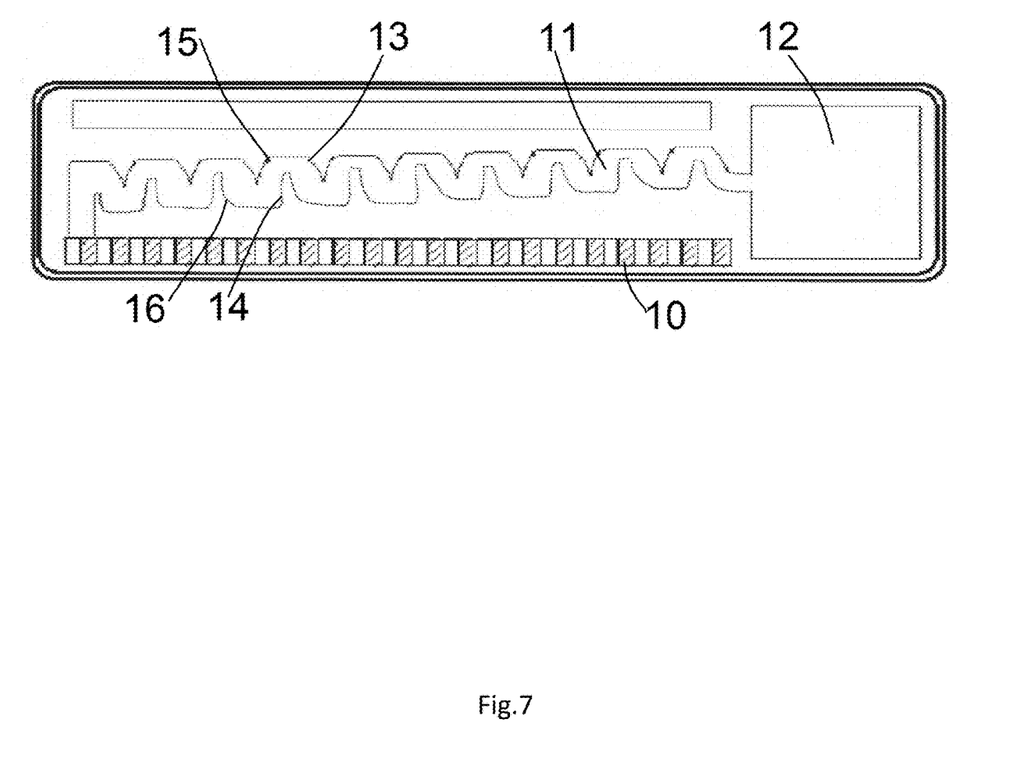
FIG. 7 shows upgraded 3D graph of optimal fractal planar FE38#.

Drip Irrigation Product A:

Planar type—length: fractal channel 39.567 mm, width: 0.824 mm, depth: 0.7555 mm, arc radius at the upwind tooth tip and tooth root area in inner wall: 0.412 mm (see FIG. 7).

Drip Irrigation Product A:

Cylindrical type—fractal channel length: 214.4 mm, width: 1.27 mm, depth: 0.745 mm, arc radius at the upwind tooth tip and tooth root area: 0.423 mm (see FIG. 8).

The high hydraulic performances (flow index x) and anti-clogging capability of Product A and B shown in FIGS. 7 and 8 are further proved by their testing application in large farm lands. (Consecutive operation period reaches 680-840 h).

The technical information unspecified in this claim are public acknowledged technical information known to all technicians of this field.

What is claimed is:

1. A method for designing a flow channel of a flow capacity-oriented drip irrigation emitter, comprising:
    step 1: determining an optimal flow channel structure by choosing from several flow channel structures put forward by a user according to design requirements of the user;
    step 2: determining optimal structural parameters of the optimal flow channel structure by calculating an anti-clogging parameter P and a flow coefficient K;
    the structural parameters of the flow channel structure include: width (W), length (L) and depth (D);
    the anti-clogging parameter P is applied to evaluate anti-clogging performance, the higher the P value, the better the anti-clogging performance;
    the flow index K is applied to evaluate sensitivity of discharging capacity upon various entrance pressure, the lower the k value; the less sensitive to the entrance pressure, the better the hydraulic performance;
    step 3: acquiring a prototype of the optimal flow channel structure by applying the optimal structural parameters;
    wherein the step 1 comprising following procedures:
    1) using a simulation model under a condition of initial roughness to examine different channel structures put forward by the user, simulating solid-liquid-gas movement of water and particles in the flow channel; the average values of near wall flow shear force $\bar{\tau}$ (Pa) of different channel structures are thus obtained;
    average sidewall roughness values under the condition of initial roughness are all default values;
    2) putting the $\bar{\tau}$ into formula (1) $\overline{S_q} = -11.43\bar{\tau}^2 + 7.51\bar{\tau} + 0.81$ to obtain average roughness values of clogging materials $\overline{S_q}$ of different channel structures;
    3) taking each of the $\overline{S_q}$ acquired in procedure 2) as average sidewall roughness value, putting it into the simulation model under initial roughness condition to obtain different simulate channel models of different channel structures under real roughness conditions;
    4) best the simulation channel models under real roughness condition of various channel structures obtained from procedure 3) to examine respectively various channel structures put forward by the user and simulating the solid-liquid-gas movement of water and particles in the channel, thus, turbulent strength inside individual flow channel structure is collected;
    choosing a flow channel structure with turbulent strength as the optimal flow channel structure.

2. The method of claim 1, wherein the step 2 comprising following procedures:
    1) applying a simulation model which is corresponds to the optimal flow channel structure under real roughness condition to determine parameter value scopes of the optimal flow channel structure, the parameter value scopes include parameter W (width) value scope, parameter L (length) value scope, parameter D (depth) value scope; determining the parameter value scopes shall meet the following requirements: energy dissipation requirement and flow index x shall be 0.50-0.55, energy dissipation requirement and flow index x shall be less influenced by the parameter changes of the optimal flow channel structure;
    2) selecting equal numbers of various W, L and D acquired in procedure 5 as representative values and each representative value shall be selected in equal space value;
    a simulation model under real roughness condition corresponding to the optimal flow channel structure is used to simulate flow capacity (Q) by calculating different combination groups of the representative values in ascending order under different entrance pressure (H); the formula (2) is acquired: Q=kHx; in formula (2), Q stands for flow capacity, k for flow coefficient level, H for entrance pressure and x for flow index;
    when the flow coefficient k represented by the representative values is obtained, the respective group that representing channel parameters will be simulated together with the flow coefficient k to obtain the forecast model of the flow coefficient k;
    3) arranging the combination groups in procedure 2) or combination groups obtained through the method stated in procedure 2) with the ascending order of the channel parameters to calculate the anti-clogging index P of each combination group, deviation of the P value from two adjacent groups will then be calculated; selecting a certain number of groups from those two adjacent deviation value P are under s %; put these selected channel parameters respectively into the forecast model of flow coefficient k to obtain the k value, the optimal channel parameters are the combination group parameters with smallest k value.

3. The method of claim 1, further comprising step 4: upgrading the prototype of the optimal flow channel structure in step 3 to a second graded refining design, optimizing inner wall surface of the prototype to keep the inner wall surface form being suffered near wall flow shear force which has value between 0.2 Pa and 0.4 Pa.

4. The method of claim 3, wherein a vortex wall washing method is adopted to optimize the inner wall surface:
    analyzing vortex distribution of the prototype of the optimal flow channel structure in step 3, according to shape and size of outer edge of the vortex, design sections of the inner wall surface which is suffered near wall flow shear force valued between 0.2 Pa and 0.4 Pa into some arcs that are the same size and shape of the outer edge of the vortex.

5. The method of claim 4, wherein the near wall flow shear force is obtained by the applying simulation model corresponding to the prototype of the optimal flow channel structure under real roughness condition or simulation model of the optimal flow channel structure under real roughness condition to simulate the water flow and particle movement in solid-liquid-gas form.

6. The method of claim 4, wherein the simulate model under initial roughness condition applies both RNG k-ε model and VOF model to represent the turbulent model of solid-liquid-gas water flow and particles movement in the inner of the flow channel structure;

and/or, experienced values are used as the default average sidewall roughness values in simulate model under initial roughness condition;

and/or, the inner wall is divided into front upwind dental tip area, upwind dental root area, downwind dental tip area and downwind dental root area.

7. A drip irrigation emitter produced by the method of claim 1, wherein the flow channel of the emitter is a modified M-fractal flow channel, two openings of the fractal channel are respectively connected to the water entrance and water exit of the emitter, the emitter is a planar-type emitter, the parameters of fractal flow path of the emitter are as follows: length: 39.567 mm, width: 0.824 mm, depth: 0.7555 mm, the upwind dental tip and upwind dental root area in inner channel shall be designed into an arc shape with radius of 0.412 mm.

8. A drip irrigation emitter produced by the method of claim 1, wherein the flow channel of the emitter is a modified M-fractal flow channel, two openings of the fractal channel are respectively connected to the water entrance and water exit of the emitter, wherein the emitter is a cylindrical emitter, the parameters of fractal flow path of the emitter are as follows: length: 214.4 mm, width: 1.27 mm, depth: 0.745 mm, the upwind dental tip and upwind dental root area in inner channel shall be designed into an arc shape with radius of 0.423 mm.

* * * * *